(12) United States Patent
Choi et al.

(10) Patent No.: US 11,891,073 B2
(45) Date of Patent: Feb. 6, 2024

(54) SYSTEMS AND METHODS FOR DETECTING AND COMPENSATING CAMERA YAW ANGLE OFFSET FOR AUTONOMOUS VEHICLES

(71) Applicant: GM GLOBAL TECHNOLOGY OPERATIONS LLC, Detroit, MI (US)

(72) Inventors: Gabriel T. Choi, Novi, MI (US); Paul A. Adam, Milford, MI (US); Jeffrey S. Parks, Ann Arbor, MI (US); Lance A. Smith, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 291 days.

(21) Appl. No.: 16/664,109

(22) Filed: Oct. 25, 2019

(65) Prior Publication Data

US 2021/0122379 A1 Apr. 29, 2021

(51) Int. Cl.
| | |
|---|---|
| *B60W 40/114* | (2012.01) |
| *B60W 30/12* | (2020.01) |
| *B60W 40/072* | (2012.01) |
| *G05D 1/02* | (2020.01) |
| *G05D 1/00* | (2006.01) |

(52) U.S. Cl.
CPC .......... *B60W 40/114* (2013.01); *B60W 30/12* (2013.01); *B60W 40/072* (2013.01); *G05D 1/0088* (2013.01); *G05D 1/0246* (2013.01); *B60W 2420/42* (2013.01); *B60W 2540/18* (2013.01); *B60W 2552/30* (2020.02); *G05D 2201/0213* (2013.01)

(58) Field of Classification Search
CPC .... B60W 40/114; B60W 30/12; G05D 1/0088
See application file for complete search history.

(56) References Cited

U.S. PATENT DOCUMENTS

| | | | |
|---|---|---|---|
| 2008/0091327 A1* | 4/2008 | Tsuchiya | G06V 20/588 701/532 |
| 2009/0319113 A1 | 12/2009 | Lee | |
| 2011/0251758 A1* | 10/2011 | Kataoka | B62D 15/025 701/41 |
| 2012/0314055 A1* | 12/2012 | Kataoka | G08G 1/167 348/117 |
| 2015/0291210 A1* | 10/2015 | Kageyama | B62D 5/04 701/41 |
| 2018/0022383 A1* | 1/2018 | Kunihiro | B62D 7/159 701/41 |

(Continued)

*Primary Examiner* — Jelani A Smith
*Assistant Examiner* — Toya Pettiegrew

(57) ABSTRACT

A control system for a vehicle using a forward-facing camera includes a look ahead module configured to determine a distance to a look ahead point. A lane center module determines a location of a lane center line. A vehicle center line module determines a location of a vehicle center line. A first lateral offset module determines a first lateral offset based on the look ahead point and the determined lane center line. A second lateral offset module determines a second lateral offset based on the determined lane center line and the vehicle center line. A yaw angle offset calculating module receives the first lateral offset, the second lateral offset and the distance to the look ahead point, calculates a yaw angle offset, and compensates a yaw angle error based on the yaw angle offset.

20 Claims, 5 Drawing Sheets

(56) References Cited

U.S. PATENT DOCUMENTS

2018/0178802 A1* 6/2018 Miyata ............ B60W 30/18163
2018/0204397 A1* 7/2018 Chundrlik, Jr. ......... G01P 13/00
2019/0384294 A1* 12/2019 Shashua ................ B60W 30/10
2020/0010073 A1* 1/2020 Ryu ...................... G06V 10/242
2020/0023884 A1* 1/2020 Mizoo ................... B60W 30/16
2020/0079372 A1* 3/2020 Hajika .................. B60W 30/12

* cited by examiner

SYSTEMS AND METHODS FOR DETECTING AND COMPENSATING CAMERA YAW ANGLE OFFSET FOR AUTONOMOUS VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for determining yaw angle offset of cameras used in autonomous vehicles (AV) and/or vehicles with advanced driver assist (ADAS) systems.

Vehicles may include a front-facing camera that generates video signals that may be used by AV and/or ADAS systems. Problems may arise if the front-facing camera is not properly aligned with the direction of travel. Variations in camera positioning can be introduced during manufacturing due to variations in manufacturing tolerances, during servicing of the vehicle, and/or in response to mechanical disturbances during vehicle operation. These alignment variations lead to errors in calculation of geometric attributes of objects in a field of view (FOV) of the camera such as lane markings.

SUMMARY

A control system for a vehicle using a forward-facing camera includes a look ahead module configured to determine a look ahead point of the forward-facing camera and a longitudinal distance from the vehicle to the look ahead point. A lane center module is configured to determine a location of a lane center line of a lane of a road occupied by the vehicle. A vehicle center line module is configured to determine a location of a vehicle center line. A first lateral offset module is configured to determine a first lateral offset based on the look ahead point and the determined lane center line. A second lateral offset module is configured to determine a second lateral offset based on the determined lane center line and the vehicle center line. A yaw angle offset calculating module is configured to receive N samples of the first lateral offset, the second lateral offset and the distance to the look ahead point, where N is an integer greater than one; calculate a yaw angle offset in response to the N samples of the first lateral offset, the second lateral offset and the distance to the look ahead point; and compensate a yaw angle error of the forward-facing camera in response to the calculation of the yaw angle offset.

In other features, the first lateral offset corresponds to a lateral distance between the determined lane center line and the vehicle center line at the longitudinal distance of the look ahead point. The second lateral offset corresponds to a lateral distance between the determined lane center line and the vehicle center line at a longitudinal distance of zero. An autonomous driving module is configured to control throttle, steering and braking inputs to the vehicle. The autonomous driving module is controlled based on output of the forward-facing camera.

In other features, a lane centering control module controls throttle, steering and braking inputs to the vehicle. The lane centering control module is controlled based on output of the forward-facing camera.

In other features, an enabling module is configured to enable the calculation of the yaw angle offset in response to determining that the vehicle is travelling on a road that has a curvature that is less than a predetermined curvature for a distance in front of the vehicle that is greater than a first predetermined distance. The enabling module is configured to enable the calculation of the yaw angle offset in response to determining that a speed of the vehicle is greater than a predetermined speed. The enabling module is further configured to enable the calculation of the yaw angle offset in response to a steering wheel angle being less than a predetermined steering wheel angle.

In other features, the yaw angle offset calculating module calculates the yaw angle offset after sampling the first lateral offset, the second lateral offset and the distance to the look ahead point while the vehicle is travelling on the road for a second predetermined distance that is less than or equal to the first predetermined distance. The yaw angle offset calculating module is configured to determine the yaw angle offset in response to an arctangent of an average of the N samples of the first lateral offset, the second lateral offset and the distance to the look ahead point while the vehicle travels on the road for the second predetermined distance.

A method for controlling a vehicle using a forward-facing camera includes determining a look ahead point of the forward-facing camera and a longitudinal distance from the vehicle to the look ahead point during operation of the vehicle; determining a location of a lane center line of a lane of a road occupied by the vehicle during operation of the vehicle; determining a location of a vehicle center line; determining a first lateral offset based on the look ahead point and the determined lane center line; determining a second lateral offset based on the determined lane center line and the vehicle center line; receiving N samples of the first lateral offset, the second lateral offset and the distance to the look ahead point, where N is an integer greater than one; calculating a yaw angle offset in response to the N samples of the first lateral offset, the second lateral offset and the distance to the look ahead point; and adjusting the yaw angle of the forward-facing camera in response to the calculation of the yaw angle offset.

In other features, the first lateral offset corresponds to a lateral distance between the determined lane center line and the vehicle center line at a longitudinal distance equal to the look ahead point. The second lateral offset corresponds to a lateral distance between the determined lane center line and the vehicle center line at a longitudinal distance of zero.

In other features, the method includes an autonomous driving mode based on output of the forward-facing camera. The method includes controlling a lane centering control mode based on output of the forward-facing camera. The method includes enabling the calculation of the yaw angle offset in response to determining that a speed of the vehicle is greater than a predetermined speed. The method includes enabling the calculation of the yaw angle offset in response to determining that the vehicle is travelling on a road that has a curvature that is less than a predetermined curvature for a distance in front of the vehicle that is greater than a first predetermined distance. The method includes enabling the calculation of the yaw angle offset in response to a steering wheel angle being less than a predetermined steering wheel angle. The method includes determining the yaw angle offset in response to an arctangent of an average of the N samples of the first lateral offset, the second lateral offset and the distance to the look ahead point that are taken while the vehicle travels on the road for the second predetermined distance.

A control system for a vehicle using a forward-facing camera includes a look ahead module configured to determine a look ahead point of the forward-facing camera and a distance to the look ahead point during operation of the vehicle. A lane center module is configured to determine a location of a lane center line of a lane of a road occupied by the vehicle during operation of the vehicle. A vehicle center line module is configured to determine a location of a vehicle center line. A first lateral offset module is configured to determine a first lateral offset based on a lateral distance between the determined lane center line and the vehicle center line at a longitudinal distance equal to the look ahead point. A second lateral offset module is configured to determine a second lateral offset based on a lateral distance between the determined lane center line and the vehicle center line at a longitudinal distance of zero. A yaw angle offset calculating module is configured to receive N samples of the first lateral offset, the second lateral offset and the distance to the look ahead point, where N is an integer greater than one; calculate a yaw angle offset in response to the N samples of the first lateral offset, the second lateral offset and the distance to the look ahead point; and compensate a yaw angle error of the forward-facing camera in response to the calculation of the yaw angle offset. An enabling module is configured to selectively enable the calculation of the yaw angle offset in response vehicle speed, road curvature ahead of the vehicle and steering wheel angle changes.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Systems and methods according to the present disclosure detect and compensate for yaw angle offset (left or right) of a front-facing camera used in advanced driver assist (ADAS) and/or an autonomous vehicle (AV) systems. When the vehicle travels on a straight road segment, the systems and methods described herein measure camera yaw angle offset and then use the yaw angle offset to adjust the yaw angle of the camera.

Commercialization of autonomous vehicles (AV) and/or vehicles using advanced driver assist systems (ADAS) will require significant reductions in cost without loss of accuracy. To reduce cost, some vehicles may use the lower resolution cameras. Systems and methods according to the present disclosure allow detection and correction of yaw angle offset using lower resolution cameras during operation of the vehicle.

While the camera typically includes an autocorrect system for yaw angle offset, the autocorrect system does not detect and correct the yaw angle offset quickly with accuracy. This is particularly true for smaller errors in yaw angle offset. Systems and methods according to the present disclosure detect and correct sub-pixel offsets of the camera. In some examples, the cameras are charge coupled device (CCD) cameras, although other types of cameras can be used.

Systems and methods according to the present disclosure utilize map information from the GPS system to determine the straightness of the road ahead. When the vehicle is driven on curved roads, it is geometrically difficult to detect and quantify yaw angle offset of the camera. Therefore, systems and methods according to the present disclosure use map information from the GPS to determine when the road located ahead of the vehicle is straight enough to initiate learning of the yaw angle offset of the camera.

After the vehicle begins driving on a straight segment of the road, the system waits a calibratable delay (such as a predetermined period or distance) to allow the control system settle into steady state.

Systems and methods according to the present disclosure allow real-time monitoring of vehicle behavior to determine when learning should be enabled. When intentional off-center driving occurs, the yaw angle offset learning is disabled. Examples of intentional off-center driving include operator steering inputs, dynamic offset, automatic or demanded lane change, and/or adjustments to allow peeking around for a better field of view (FOV) for the other sensors.

Systems and methods according to the present disclosure detect sub-pixel yaw angle offset of the cameras. High-definition map data can be used to enable yaw angle offset learning. The detected camera yaw angle offset is used to calculate a virtual path (or blue line) for lane centering control (LCC). Systems and methods according to the present disclosure compensate for the detected camera yaw angle offset during the LCC.

Figure 1:
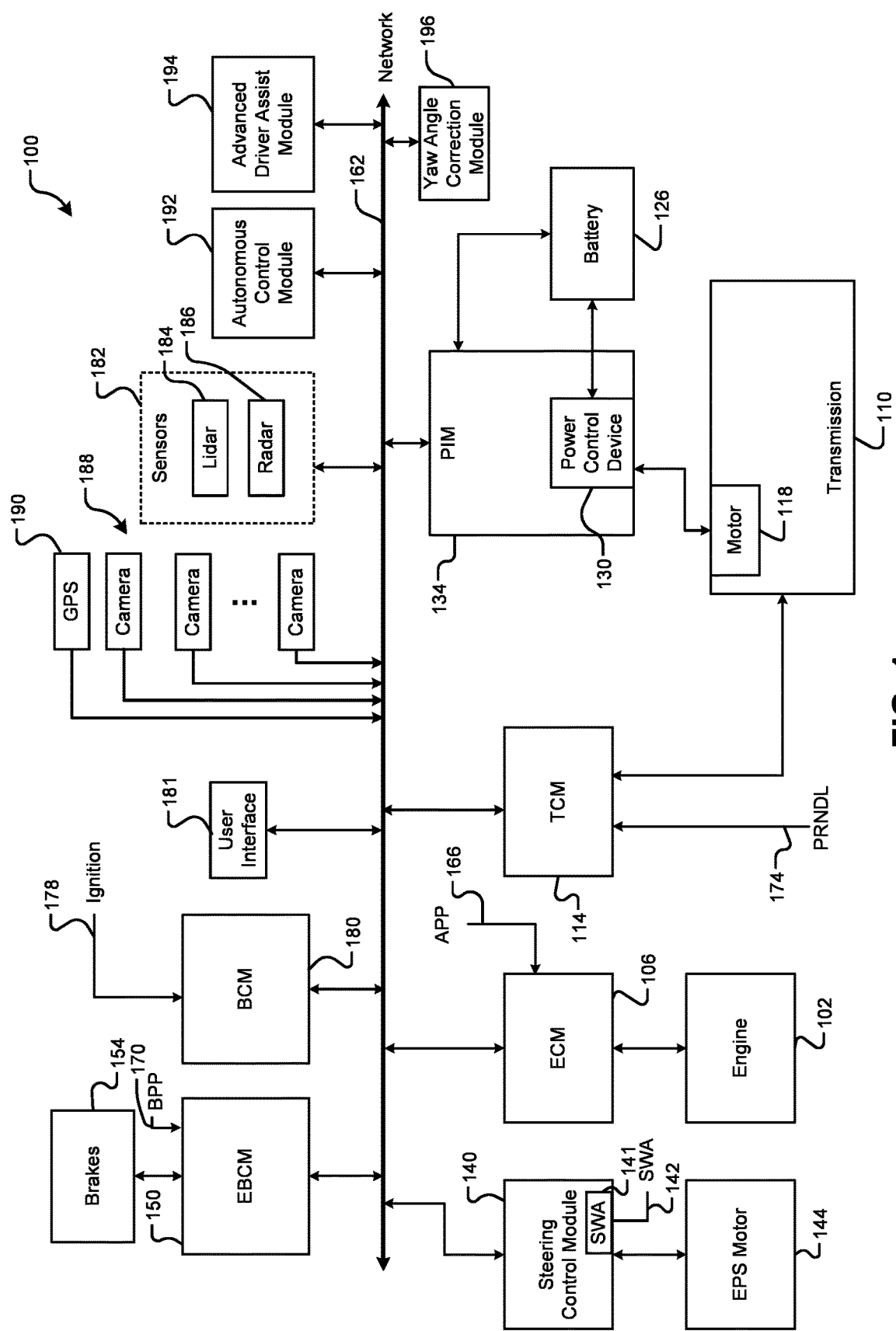
FIG. 1 is a functional block diagram of an example of a vehicle control system according to the present disclosure.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, and/or other types of vehicles.

An engine 102 may combust an air/fuel mixture to generate drive torque. An engine control module (ECM) 106 controls the engine 102 based on driver inputs and/or one or more other torque requests/commands from one or more vehicle control modules. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (such as pure electric vehicles), the engine 102 may be omitted.

The engine 102 outputs torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, the electric motor converts mechanical energy into electrical energy. The electrical energy can be used to charge a battery 126 via a power control device (PCD) 130. When acting as a motor, the electric motor generates torque that may be used to supplement or replace torque output by the engine 102. While the example of one electric motor is provided, the vehicle may not include an electric motor at all or may include more than one electric motor.

A power inverter control module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126.

A steering control module 140 controls steering/turning of wheels of the vehicle, for example, based on the driver turning a steering wheel within the vehicle and/or steering commands from one or more vehicle control modules. A steering wheel angle sensor (SWA) 141 monitors a rotational position of the steering wheel and generates a SWA signal 142 based on the position of the steering wheel. As an example, the steering control module 140 may control vehicle steering via an EPS motor 144 based on the SWA signal 142.

An electronic brake control module (EBCM) 150 may selectively control brakes 154 of the vehicle based on the driver inputs and/or one or more other braking requests/commands from one or more vehicle control modules.

Control modules of the vehicle may share parameters via a network 162, such as a controller area network (CAN). The CAN may also be referred to as a car area network. For example, the network 162 may include one or more data buses. Various parameters may be made available by a given control module to other control modules via the network 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. For example, the ignition state 178 may be off, accessory, run, or crank.

The vehicle includes a user interface 181 such as a touch screen, buttons, knobs, etc. to allow an occupant to select or deselect driving modes such as AV and/or ADAS driving modes. The vehicle may include a plurality of sensors 182 (such as radar sensors 186 and/or lidar sensors 184) and one or more cameras 188.

The vehicle includes a global positioning system (GPS) 190 to determine a position and path of the vehicle relative to streets and/or roadways. The vehicle further includes an autonomous driving module 192 and/or an advanced driver assist module 194. The autonomous driving module 192 controls the acceleration, braking and/or steering of the vehicle with limited or no human intervention. The advanced driver assist module 194 controls the acceleration, braking and/or steering of the vehicle in more limited circumstances such as during lane changes, lane centering, and/or other modes. The yaw angle correction module 196 processes images, GPS data, sensor data, etc., which is used by the autonomous driving module 192 and/or the advanced driver assist module 194 to control the vehicle. Examples of lane centering, path determination and look ahead point identification can be found in commonly-assigned U.S. Patent Publication 2009/0319113, filed on Dec. 24, 2009, which is hereby incorporated by reference in its entirety.

Figure 2:
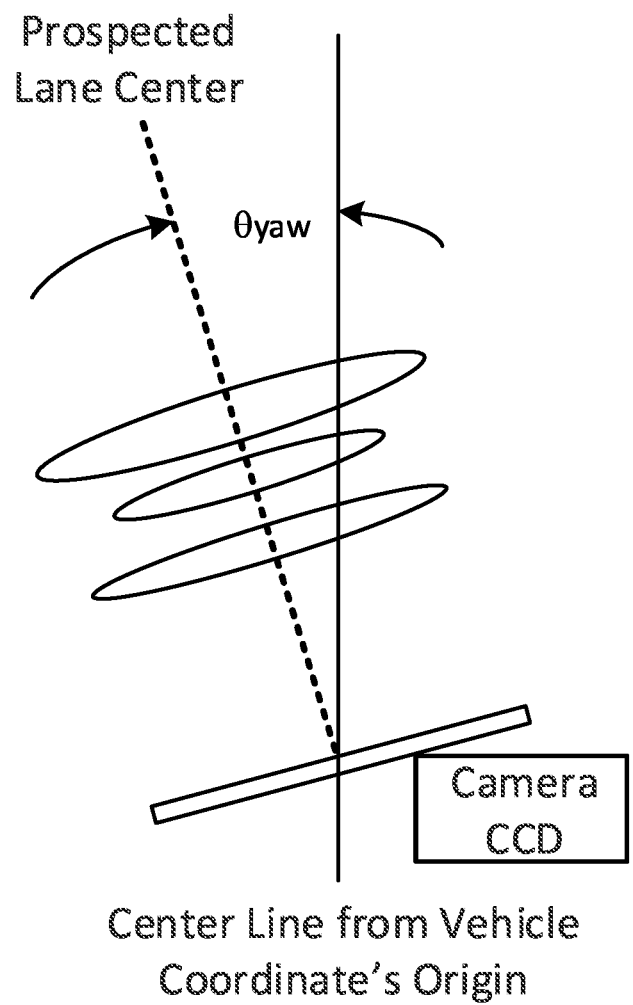
FIG. 2 is an illustration of an example of yaw angle offset.

Referring now to FIG. 2, the vehicle includes a camera 200 (such as a charge coupled device (CCD) or other camera) and a lens 210. A yaw angle offset $\Theta_{yaw}$ is defined between a center line of coordinate origin of the vehicle and a lane center of a road that the vehicle is travelling on.

Figure 3:
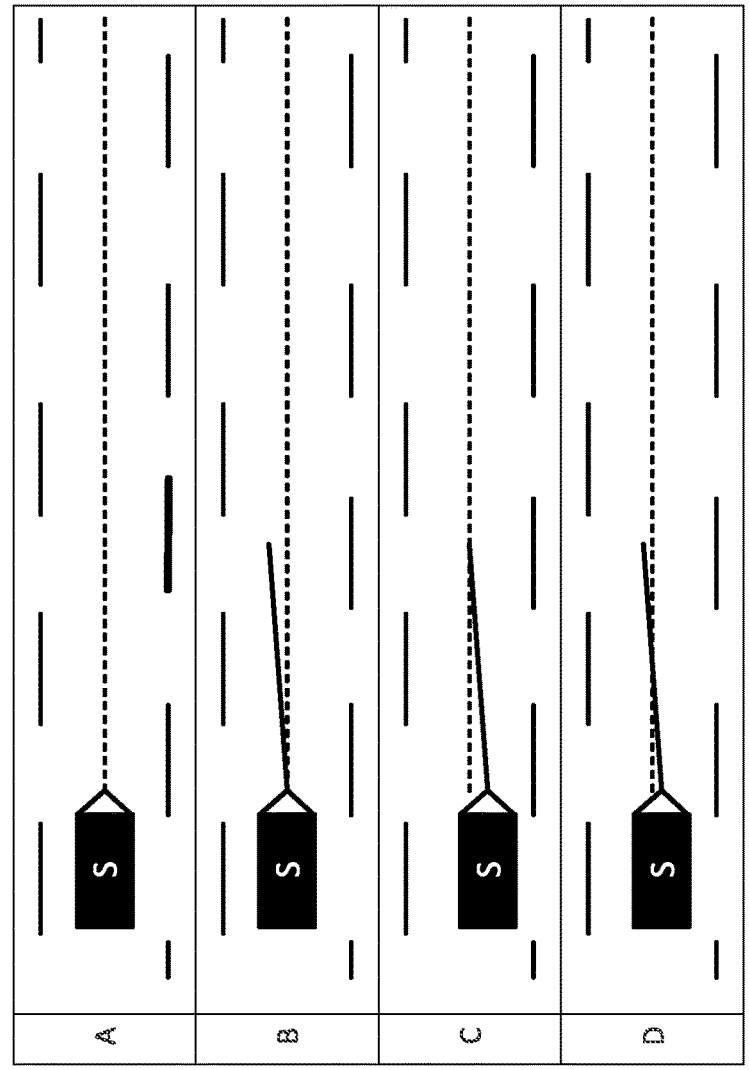
FIG. 3 is an illustration of examples of various yaw angle offset conditions.

Referring now to FIG. 3, examples of various orientations of the vehicle relative to a lane are shown. In example A, there is no yaw angle offset $\Theta_{yaw}$. The vehicle is centered on the center line of the lane. In example B, yaw angle offset $\Theta_{yaw}$ is shown without centering control. The vehicle is traveling on the center of the lane. Since the camera is aiming front-left, the autonomous lane centering will maneuver the vehicle to the right side of the lane as shown in example C.

In example C, the yaw angle offset $\Theta_{yaw}$ is shown with lane centering control. The lane centering control is satisfied since the look-ahead position coincides with the lane center. In example D, a vehicle is shown with close point lane centering control. The lane centering controller using a closer look ahead point provides some compensation but does not remove the centering offset fully.

Figure 4:
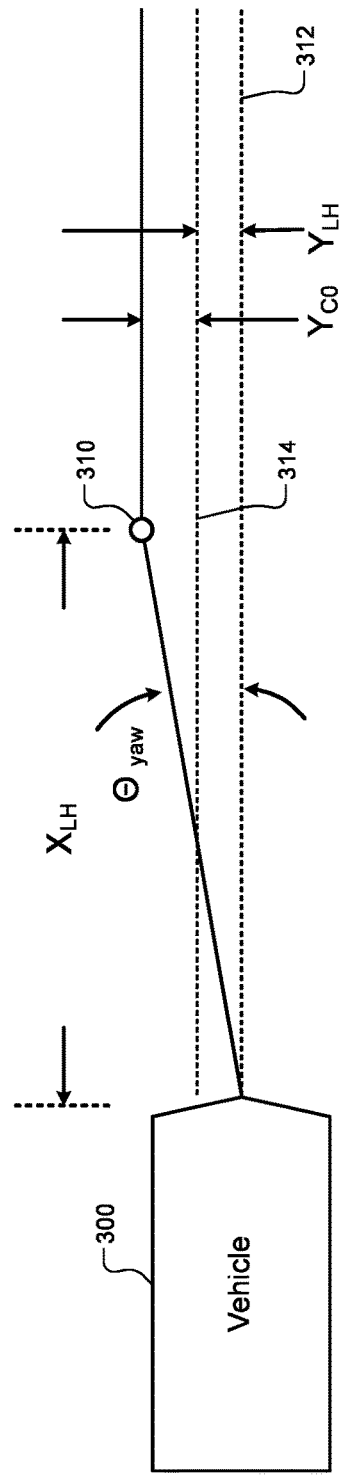
FIG. 4 is an illustration of yaw angle offset calculation according to the present disclosure.

Referring now to FIG. 4, a vehicle 300 is shown. A look ahead point is shown at 310. A center line from the coordinate origin of the vehicle is shown at 312. A prospected lane center (or center line of the lane) is shown at 314. $Y_{LH}$ is the lateral offset from the prospected lane center at the look ahead point. $Y_{C0}$ is the lateral offset from the prospected lane center at the vehicle location. $X_{LH}$ is the look ahead distance.

The yaw angle offset is calculated based upon the following:

$$\Theta_{yaw}=\arctan\left[(\Sigma(Y_{LH}+Y_{C0})/X_{LH})/N\right]$$

The calculated yaw angle offset can be used to adjust the yaw angle of the camera.

Figure 5:
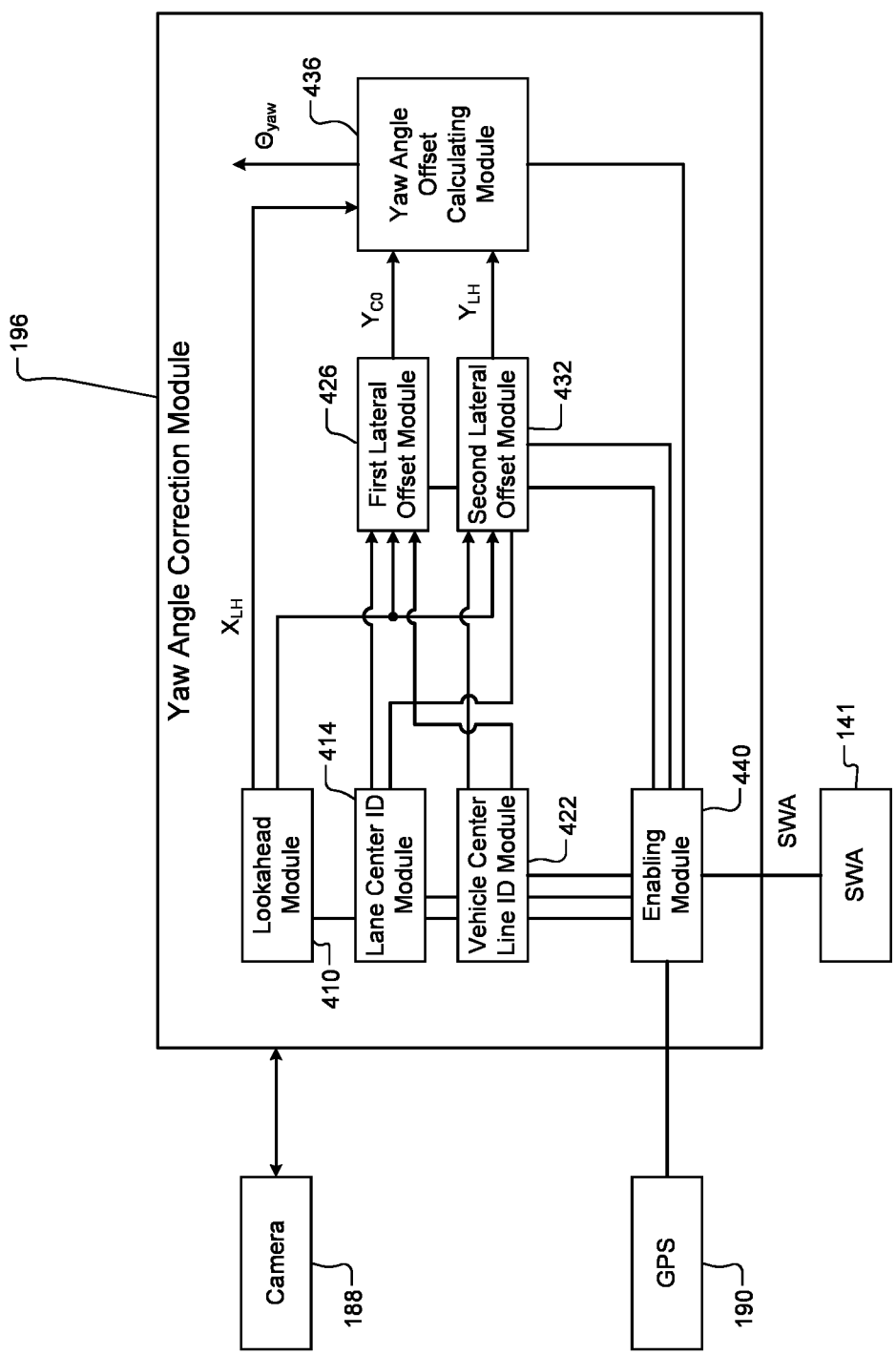
FIG. 5 is a functional block diagram of a yaw angle correction module.

Referring now to FIG. 5, an image processor 400 includes a look ahead module 410 that determines a location of a look ahead point relative to the vehicle coordinate origin and a longitudinal distance $X_{LH}$ from the vehicle to the look ahead point. In some examples, the longitudinal distance $X_{LH}$ is equal to 20 to 50 meters (m) (e.g. 40 m), although other values can be used. A lane center ID module 414 determines a location of a center line of a lane on a roadway that the vehicle is travelling on. A vehicle center ID module 422 determines a location of a center line of the vehicle.

First and second lateral offsets are measured approximately perpendicular to the direction of vehicle travel. A first lateral offset module 426 determines a first lateral offset $Y_{LH}$, which is the lateral offset between the road center line and the centerline of the vehicle center measured at the longitudinal distance $X_{LH}$. A second lateral offset module 132 determines a second lateral offset $Y_{C0}$, which is the lateral offset between the road center line and the vehicle center line (at a longitudinal distance of 0 or at the vehicle). In other words, $Y_{C0}$ and $Y_{LH}$ are both lateral offsets that describe the center line of the road with respect to the centerline of the host vehicle. $X_{LH}$ represents the longitudinal distance in front of vehicle. $Y_{LH}$ and $Y_{C0}$ are a function of the longitudinal distance X. $Y_{C0}=Y(X=0)$ and $Y_{LH}=Y(X=X_{LH})$.

A yaw angle offset calculating module 436 calculates the yaw angle offset $\Theta_{yaw}$ in response to N samples of the first lateral offset $Y_{LH}$, the second lateral offset $Y_{C0}$ and the look ahead distance $X_{LH}$, where N is an integer In some examples, the yaw angle offset $\Theta_{yaw}$ is calculated based upon:

$$\Theta_{yaw} = \arctan\left[(\Sigma(Y_{LH}+Y_{C0})/X_{LH})/N\right]$$

An enabling module 440 selectively enables calculation of the yaw angle offset based on one or more conditions being met. For example, the enabling module 440 may enable yaw angle offset calculations when one or more of the following are true: an AV or ADAS mode is enabled; the vehicle speed is greater than or equal to a predetermined vehicle speed; the SWA is less than a predetermined SWA; and/or the GPS determines that the vehicle is on a road that has a maximum curvature that is less than a predetermined curvature for a first predetermined distance.

Figure 6:
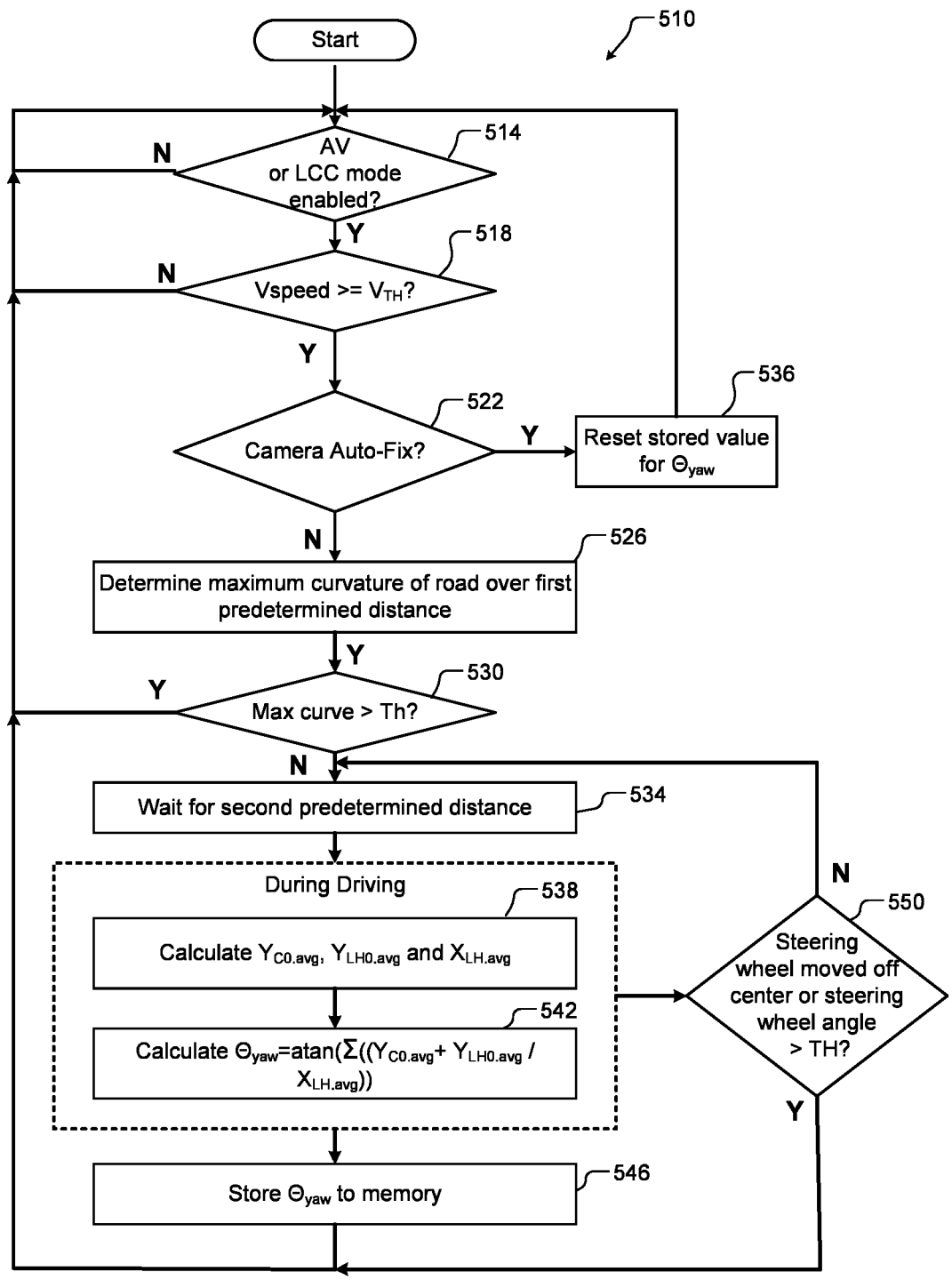
FIG. 6 is a flowchart of an example of a method for calculating yaw angle offset.

Referring now to FIG. 6, a method 510 for calculating the angle offset is shown. At 514, the method determines whether lane centering control (LCC) is enabled. If 514 is true, the method continues at 518 and determines whether the vehicle speed is greater than or equal to a predetermined speed threshold. If 518 is true, the method continues at 522 and determines whether the camera auto fix is enabled.

If 522 is true, the method resets the stored value for the yaw angle offset $\Theta_{yaw}$. If 522 is false, the method continues at 526 and determines the maximum curvature of the road over a first predetermined distance. In some examples, the first predetermined distance is equal to 2 km, although other distances may be used. In 530, the method determines whether the maximum curvature is greater than a curvature threshold. If 530 is true, the method returns to 514. If 530 is false, the method waits for the vehicle to travel a second predetermined distance greater than zero and less than or equal to the first predetermined distance. In some examples, the second predetermined distance is equal to 1.5 km, although other distances may be used.

At 538, the method calculates $Y_{C0.avg}$, $Y_{LH0.avg}$ and $X_{LH.avg}$. At 542, the method calculates $\Theta_{yaw} = \arctan[(\Sigma(Y_{LH}+Y_{C0})/X_{LH})/N]$. At 546, the method stores the yaw angle offset $\Theta_{yaw}$ in memory. If the operator of the vehicle moves the steering wheel off-center or a steering wheel angle is increased greater than a threshold as determined at 550, the method returns to 514. If 550 is false, the method returns to 514.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A control system for a vehicle using a forward-facing camera, comprising:
a look ahead circuit configured to determine a look ahead point of the forward-facing camera and a distance from the vehicle to the look ahead point;
a lane center circuit configured to determine a location of a lane center line of a lane of a road occupied by the vehicle;
a vehicle center line circuit configured to determine a location of a vehicle center line;
a first lateral offset circuit configured to determine a first lateral offset between the determined location of the lane center line and the look ahead point at a first longitudinal distance from the vehicle;
a second lateral offset circuit configured to determine a second lateral offset between the vehicle and the determined location of the center lane at a second longitudinal distance from the vehicle, wherein the first and second longitudinal distances are different, the first longitudinal distance is a distance in front of the vehicle based on the look ahead point, and the second longitudinal distance corresponds to a location of the vehicle;
a yaw angle offset calculating circuit configured to:
receive N samples of the first lateral offset, N samples of the second lateral offset, and the distance to the look ahead point, where N is an integer greater than one;
calculate a yaw angle offset of the forward-facing camera using both the N samples of the first lateral offset and the N samples of the second lateral offset and the distance to the look ahead point, wherein the yaw offset angle of the forward-facing camera corresponds to alignment of the forward-facing camera relative to the vehicle,
the calculation of the yaw angle offset being performed using the equation:

$$\Theta_{yaw} = \arctan\left[(\Sigma(Y_{LH}+Y_{C0})/X_{LH})/N\right],$$

where $\Theta_{yaw}$ is the yaw angle offset, $Y_{LH}$ are the samples of the first lateral offset, $Y_{c0}$ are
the samples of the second lateral offset, $X_{LH}$ is the look ahead distance, and N is the integer greater than one; and
compensate a yaw angle error of the forward-facing camera in response to the calculation of the yaw angle offset of the forward-facing camera; and
an autonomous driving circuit configured to, based on the yaw angle offset, control at least one of acceleration of the vehicle, application of brakes of the vehicle of the vehicle, and steering of the vehicle.

2. The control system of claim 1, wherein the first lateral offset corresponds to a lateral distance between the determined location of the lane center line and the vehicle center line at a longitudinal distance equal to the look ahead point.

3. The control system of claim 1, wherein the second lateral offset corresponds to a lateral distance between the determined location of the lane center line and the vehicle center line at a longitudinal distance of zero.

4. The control system of claim 1, further comprising an autonomous driving circuit configured to control throttle, steering and braking inputs to the vehicle, wherein the autonomous driving circuit is controlled based on output of the forward-facing camera.

5. The control system of claim 1, further comprising a lane centering control circuit to control throttle, steering and braking inputs to the vehicle, wherein the lane centering control circuit is controlled based on output of the forward-facing camera.

6. The control system of claim 1, further comprising an enabling circuit configured to enable the calculation of the yaw angle offset in response to determining that the vehicle is travelling on a road that has a curvature that is less than a predetermined curvature for a distance in front of the vehicle that is greater than a first predetermined distance.

7. The control system of claim 6, wherein the enabling circuit is configured to enable the calculation of the yaw angle offset in response to determining that a speed of the vehicle is greater than a predetermined speed.

8. The control system of claim 6, wherein the enabling circuit is further configured to enable the calculation of the yaw angle offset in response to a steering wheel angle being less than a predetermined steering wheel angle.

9. The control system of claim 7, wherein the yaw angle offset calculating circuit calculates the yaw angle offset after sampling the first lateral offset, the second lateral offset and the distance to the look ahead point while the vehicle is travelling on the road for a second predetermined distance that is less than or equal to the first predetermined distance.

10. The control system of claim 9, wherein the yaw angle offset calculating circuit is configured to determine the yaw angle offset by calculating an arctangent of an average of the N samples of the first lateral offset and the N samples of the second lateral offset divided by the distance to the look ahead point while the vehicle travels on the road for the second predetermined distance.

11. A method for controlling a vehicle using a forward-facing camera, comprising:
   determining a look ahead point of the forward-facing camera and a distance to the look ahead point during operation of the vehicle;
   determining a location of a lane center line of a lane of a road occupied by the vehicle during operation of the vehicle;
   determining a location of a vehicle center line;
   determining a first lateral offset between the determined location of the lane center line and the look ahead point at a first longitudinal distance from the vehicle;
   determining a second lateral offset between the vehicle and the determined location of the center lane at a second longitudinal distance from the vehicle, wherein the first and second longitudinal distances are different, the first longitudinal distance is a distance in front of the vehicle based on the look ahead point, and the second longitudinal distance corresponds to a location of the vehicle;
   receiving N samples of the first lateral offset, N samples of the second lateral offset, and the distance to the look ahead point, where N is an integer greater than one;
   calculating a yaw angle offset of the forward-facing camera using both the N samples of the first lateral offset and the N samples of the second lateral offset and the distance to the look ahead point, wherein the yaw offset angle of the forward-facing camera corresponds to alignment of the forward-facing camera relative to the vehicle,
   the calculation of the yaw angle offset being performed using the equation:

$$\Theta_{yaw}=\arctan\,[(\Sigma(Y_{LH}+Y_{C0})/X_{LH})/N],$$

where $\Theta_{yaw}$ is the yaw angle offset, $Y_{LH}$ are the samples of the first lateral offset, $Y_{c0}$ are the samples of the second lateral offset, $X_{LH}$ is the look ahead distance, and N is the integer greater than one;
   adjusting the yaw angle of the forward-facing camera in response to the calculation of the yaw angle offset of the forward-facing camera; and
   based on the yaw angle offset, controlling at least one of acceleration of the vehicle, application of brakes of the vehicle of the vehicle, and steering of the vehicle.

12. The method of claim 11, wherein the first lateral offset corresponds to a lateral distance between the determined location of the lane center line and the vehicle center line at a longitudinal distance equal to the look ahead point.

13. The method of claim 11, wherein the second lateral offset corresponds to a lateral distance between the determined location of the lane center line and the vehicle center line at a longitudinal distance of zero.

14. The method of claim 11, further comprising controlling an autonomous driving mode based on output of the forward-facing camera.

15. The method of claim 11, further comprising controlling a lane centering control mode based on output of the forward-facing camera.

16. The method of claim 11, further comprising enabling the calculation of the yaw angle offset in response to determining that a speed of the vehicle is greater than a predetermined speed.

17. The method of claim 16, further comprising enabling the calculation of the yaw angle offset in response to determining that the vehicle is travelling on a road that has a curvature that is less than a predetermined curvature for a distance in front of the vehicle that is greater than a first predetermined distance.

18. The method of claim 16, further comprising enabling the calculation of the yaw angle offset in response to a steering wheel angle being less than a predetermined steering wheel angle.

19. The method of claim 17, further comprising determining the yaw angle offset by calculating an arctangent of an average of the N samples of the first lateral offset and the N samples of the second lateral offset divided by the distance to the look ahead point that are taken while the vehicle travels on the road for the first predetermined distance.

20. A control system for a vehicle using a forward-facing camera, comprising:
   a look ahead circuit configured to determine a look ahead point of the forward-facing camera and a distance to the look ahead point during operation of the vehicle;
   a lane center circuit configured to determine a location of a lane center line of a lane of a road occupied by the vehicle during operation of the vehicle;
   a vehicle center line circuit configured to determine a location of a vehicle center line;
   a first lateral offset circuit configured to determine a first lateral offset corresponding to a lateral distance between the determined location of the lane center line and the look ahead point at a first longitudinal distance from the vehicle equal to the look ahead point;
   a second lateral offset circuit configured to determine a second lateral offset corresponding to a lateral distance between the determined location of the lane center line and the vehicle center line at a second longitudinal distance from the vehicle of zero, wherein the first and second longitudinal distances are different and the second longitudinal distance corresponds to a location of the vehicle;
   a yaw angle offset calculating circuit configured to:
      receive N samples of the first lateral offset, N samples of the second lateral offset, and the distance to the look ahead point, where N is an integer greater than one;
      calculate a yaw angle offset of the forward-facing camera using both the N samples of the first lateral offset and the N samples of the second lateral offset and the distance to the look ahead point, wherein the yaw offset angle of the forward-facing camera corresponds to alignment of the forward-facing camera relative to the vehicle,
      the calculation of the yaw angle offset being performed using the equation:

$$\Theta_{yaw}=\arctan\,[(\Sigma(Y_{LH}+Y_{C0})/X_{LH})/N],$$

where $\Theta_{yaw}$ is the yaw angle offset, $Y_{LH}$ are the samples of the first lateral offset, $Y_{c0}$ are the samples of the second lateral offset, $X_{LH}$ is the look ahead distance, and N is the integer greater than one; and compensate a yaw angle error of the forward-facing camera in response to the calculation of the yaw angle offset of the forward-facing camera;

an enabling circuit configured to selectively enable the calculation of the yaw angle offset in response vehicle speed, road curvature ahead of the vehicle and steering wheel angle changes; and an autonomous driving circuit configured to, based on the yaw angle offset, control at least one of acceleration of the vehicle, application of brakes of the vehicle of the vehicle, and steering of the vehicle.

* * * * *